(12) United States Patent
Qi

(10) Patent No.: US 12,442,501 B1
(45) Date of Patent: Oct. 14, 2025

(54) FLAMELESS LED CANDLE WITH SIMULATED FLAME AND WICK

(71) Applicant: Xiaowu Qi, Singapore (SG)

(72) Inventor: Xiaowu Qi, Singapore (SG)

( * ) Notice: Subject to any disclaimer, the term of this patent is extended or adjusted under 35 U.S.C. 154(b) by 0 days.

(21) Appl. No.: 19/021,761

(22) Filed: Jan. 15, 2025

(30) Foreign Application Priority Data

Dec. 27, 2024 (CN) .......................... 202423273220.X

(51) Int. Cl.
| | | |
|---|---|---|
| F21S 10/04 | (2006.01) |
| F21S 9/02 | (2006.01) |
| F21V 17/16 | (2006.01) |
| F21Y 113/00 | (2016.01) |
| H01M 50/271 | (2021.01) |

(52) U.S. Cl.
CPC ............... F21S 10/043 (2013.01); F21S 9/02 (2013.01); F21V 17/164 (2013.01); H01M 50/271 (2021.01); *F21Y 2113/00* (2013.01)

(58) Field of Classification Search
CPC .......... F21S 10/04; F21S 10/043; F21S 6/001; H01M 50/271
See application file for complete search history.

(56) References Cited

U.S. PATENT DOCUMENTS

| | | | | |
|---|---|---|---|---|
| 2005/0047127 A1* | 3/2005 | Tutman | ................... | F21S 10/04 362/205 |
| 2012/0195030 A1* | 8/2012 | Fournier | ............... | F21S 10/043 362/157 |
| 2017/0122541 A1* | 5/2017 | Patton | ....................... | A61L 9/12 |
| 2018/0254441 A1* | 9/2018 | Li | ....................... | H01M 50/213 |
| 2019/0353317 A1* | 11/2019 | Chang | ................... | F21S 10/043 |
| 2021/0080092 A1* | 3/2021 | Carpintero | ............ | F21S 10/043 |
| 2024/0159366 A1* | 5/2024 | Huang | ................... | F21V 23/04 |

FOREIGN PATENT DOCUMENTS

| | | | | |
|---|---|---|---|---|
| CN | 201739784 U | * | 2/2011 | |
| CN | 204268336 U | * | 4/2015 | |
| DE | 202014009335 U1 | * | 1/2015 | ............ F21V 31/005 |
| DE | 202024100183 U1 | * | 5/2024 | ........ H01M 50/271 |
| KR | 20100000048 U | * | 1/2010 | ............. F21S 6/001 |

* cited by examiner

*Primary Examiner* — Alexander K Garlen
(74) *Attorney, Agent, or Firm* — Hemisphere Law, PLLC; Zhigang Ma

(57) ABSTRACT

A flameless LED candle includes a shell. The shell includes: a battery box including a battery; a candle flame, including a LED light therein; and a switch device. The LED light includes a first pin and a second pin, the first pin and the second pin are provided with a black wick sleeve, a connecting component is disposed under the LED light, the first pin is connected to the battery through the connecting component, and the second pin is connected to the switch device through the connecting component. The flameless LED candle is highly practical with a simple structure, convenient to assemble, with strong stability in use, and safer and more reliable.

9 Claims, 7 Drawing Sheets

FLAMELESS LED CANDLE WITH SIMULATED FLAME AND WICK

TECHNICAL FIELD

The disclosure relates to the technical field of flameless light-emitting diode (LED) candles, and more particularly to a novel flameless LED candle with simulated flame and wick.

BACKGROUND

Flameless LED candles have characteristics such as being smoke-free, highly safe, and having a long service life. As simulation degree of the flameless LED candles increases, the flameless LED candles have been used in many occasions to replace traditional real wax candles.

Existing flameless LED candles have a structure where a wick guide tube is connected the candle flame and candle body shell. Two wires that electrically connect a luminous body with a circuit board are threaded through the wick guide tube. In an assembly and production process of a flameless LED candle, it is necessary to first weld two longer wires to the luminous body, thread the wires through the wick guide tube, and then fix the wires and the wick guide tube to the candle flame as a whole, with glue. Then, the other ends of the wires are welded to the circuit board, and the circuit board and a battery box are fixed inside the candle body shell. Finally, the whole flameless candle is assembled. After assembly, the wick guide tube still needs to be adjusted to an appropriate position. The flameless LED candles with this complex structure not only have many parts and materials, which leads to low safety and reliability, but also have a very troublesome assembly process, and the quality and stability of the flameless LED candles are easily affected by the skill level of workers.

The battery box of the flameless LED candles in the related art can be easily opened if not secured with screws, which affects the safe use of the flameless LED candles and greatly impacts their reliable use. However, if secured with screws, both material costs and production steps are increased.

SUMMARY

A purpose of the disclosure is to provide a novel flameless LED candle which is highly practical with a simple structure, convenient to assemble, with strong stability in use, and safer and more reliable.

In order to achieve above purpose, the disclosure provides the flameless LED candle including a shell. The shell includes a battery box, a candle flame and a switch device. The battery box includes a battery. The candle flame includes a light-emitting diode (LED) light therein. The LED light includes a first pin and a second pin. The first pin and the second pin are provided with a black wick sleeve. A connecting component is disposed under the LED light, the first pin is connected to the battery through the connecting component, and the second pin is connected to the switch device through the connecting component.

In an embodiment, the black wick sleeve defines a first through hole and a second through hole, the first pin is disposed in the first through hole, and the second pin is disposed in the second through hole.

In an embodiment, the connecting component is cylindrical, a surface of the connecting component defines a connecting component hole, the connecting component defines a notch underside, the first pin is connected to the battery through the connecting component hole, and the second pin is connected to the switch device through the connecting component hole along the notch.

In an embodiment, an outer wall of the connecting component is provided with a first convex edge of a ring shape.

In an embodiment, the LED light includes a fixing component, and the fixing component is installed on the black wick sleeve.

In an embodiment, the fixing component is cylindrical and defines a fixing component hole, and the black wick sleeve is disposed in the fixing component through the fixing component hole.

In an embodiment, an outer wall of the fixing component is provided with a second convex edge of a ring shape, and a height of the fixing component is flush with a height of the black wick sleeve.

In an embodiment, a bottom of the candle flame defines a first recess, and the first recess is snap-fitted to the second convex edge.

In an embodiment, a first latch is disposed in the first recess, and the first recess is snap-fitted to the second convex edge through the first latch.

In an embodiment, the battery box includes a battery compartment cover and a battery compartment therein, and the battery is disposed in the battery compartment.

In an embodiment, a side of the battery compartment cover is provided with a U-shaped latch, and the battery box includes an elastic block disposed in the U-shaped latch.

In an embodiment, the battery box includes an elastic piece, the elastic block is disposed on the elastic piece, the elastic piece includes a button, and a position of the button corresponds to a position of the elastic block.

The beneficial effects of the technical solutions provided by the disclosure are as follows. (1) The disclosure includes the shell including the battery box, the battery box includes the battery, the shell further includes the candle flame and the switch device, the candle flame includes the LED light therein, the LED light includes the first pin and the second pin, the black wick sleeve is disposed on the first pin and the second pin, the connecting component is disposed under the LED light, the first pin is connected to the battery through the connecting component, and the second pin is connected to the switch device through the connecting component. The disclosure simulates an effect of a candle leaving a black wick after burning by providing the black wick sleeve on the first and second pins; the disclosure has a connecting component disposed and the pin connected to the switch device, forming an integrated structure, which makes assembly simpler, more stable, and safer to use. (2) The disclosure eliminates the need for a circuit board and control circuit structure, simplifying the design and significantly reducing production costs. (3) The battery box of the disclosure is provided with an anti-opening device that does not require screws, achieving the effect of preventing the battery box from being opened without increasing material costs and production steps, thereby enhancing the safety of the product.

BRIEF DESCRIPTION OF DRAWINGS

In order to provide a clearer explanation of the embodiments of the disclosure or the technical solutions in the related art, a brief introduction is given to the accompanying drawings required for the description of the embodiments or the related art. It is apparent that the accompanying drawings described below are only some embodiments of the disclosure. For those skilled in the art, other drawings can be obtained based on the structures shown in the accompanying drawings without creative labor.

Figure 1:
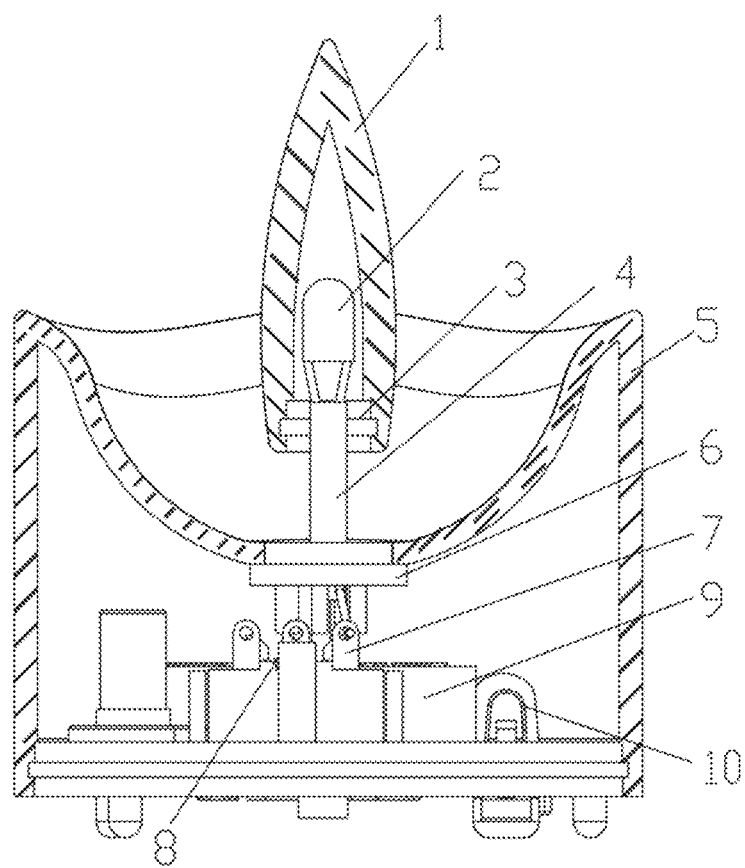
FIG. 1 illustrates a schematic structural diagram of a flameless LED candle according to an embodiment of the disclosure.
Figure 2:
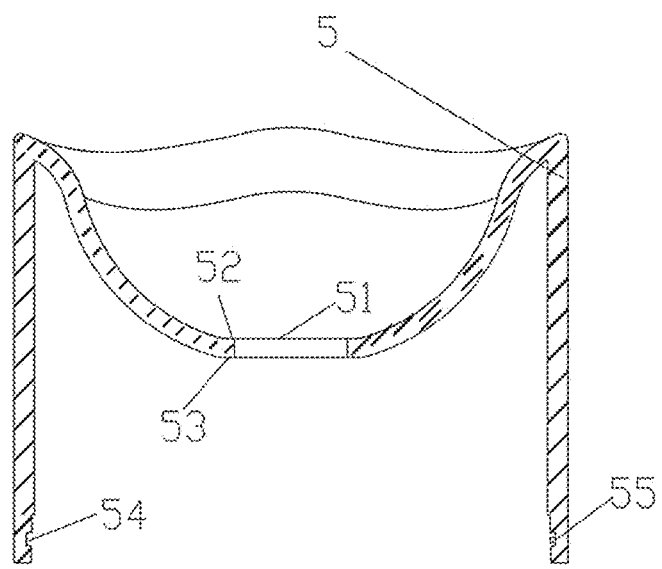
FIG. 2 illustrates a schematic structural diagram of an outer shell of the flameless LED candle according to the embodiment of the disclosure.
Figure 3:
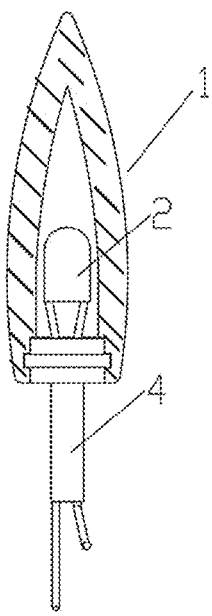
FIG. 3 illustrates a schematic structural diagram of a candle flame of the flameless LED candle according to the embodiment of the disclosure.
Figure 4:
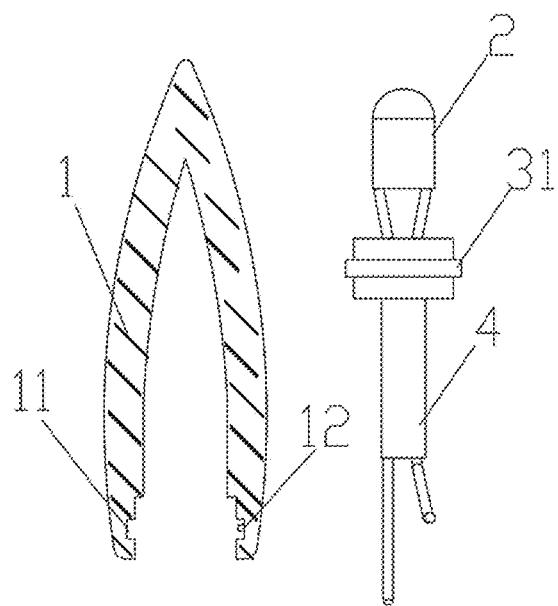
FIG. 4 illustrates an exploded view of the candle flame of the flameless LED candle according to the embodiment of the disclosure.
Figure 5:
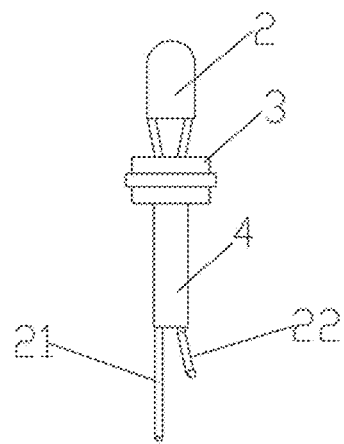
FIG. 5 illustrates a schematic structural diagram of a LED light of the flameless LED candle according to the embodiment of the disclosure.
Figure 6:
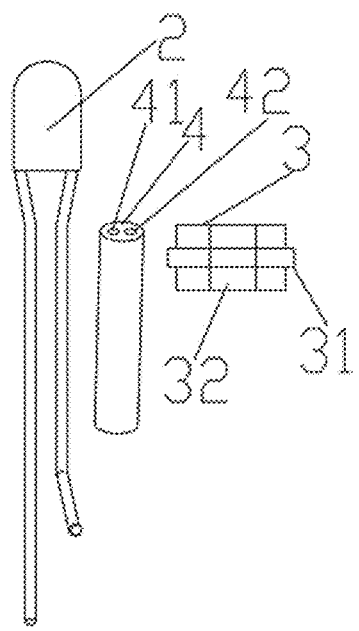
FIG. 6 illustrates an exploded view of the LED light of the flameless LED candle according to the embodiment of the disclosure.

The purpose, functional characteristics, and advantages of the disclosure will be further explained with reference to the accompanying drawings in conjunction with the embodiments.

DETAILED DESCRIPTION OF EMBODIMENTS

The disclosure provides a novel flameless LED candle.

Embodiment 1

Referring to FIG. 1 to FIG. 13, in an embodiment of the disclosure, the flameless LED candle includes a shell 5. The shell 5 includes a battery box 9. The battery box 9 includes a battery 110. The shell 5 includes a candle flame 1 and a switch device 7. The candle flame 1 is exposed out the shell 5. The candle flame 1 includes a LED light 2 therein. The LED light 2 includes a first pin 21 and a second pin 22. The first pin 21 and the second pin 22 are provided with a black wick sleeve 4. A connecting component 6 is disposed under the LED light 2, the first pin 21 is connected to the battery 110 through the connecting component 6, and the second pin 22 is connected to the switch device 7 through the connecting component 6.

In the embodiment, the black wick sleeve 4 is disposed on the first pin 21 and the second pin 22, making the flameless LED candle of the disclosure simulate a black wick left after a candle is burned, thereby being more realistic and true-to-life. Moreover, the black wick sleeve 4 plays a protective role for the first pin 21 and the second pin 22.

Figure 7:
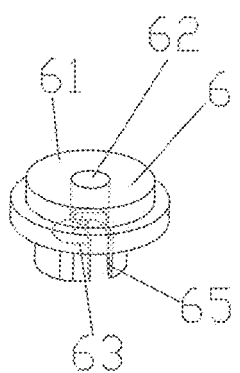
FIG. 7 illustrates a schematic structural diagram of a connecting component of the flameless LED candle according to the embodiment of the disclosure.
Figure 8:
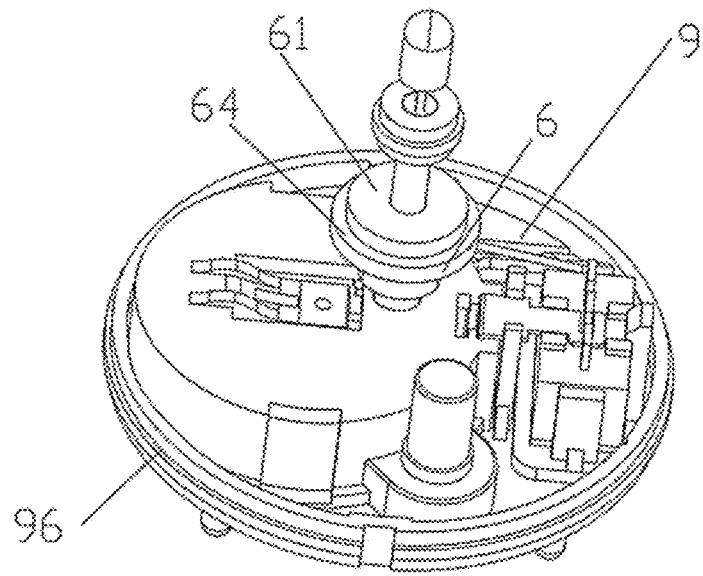
FIG. 8 illustrates a first schematic structural diagram of a battery box of the flameless LED candle according to the embodiment of the disclosure.
Figure 9:
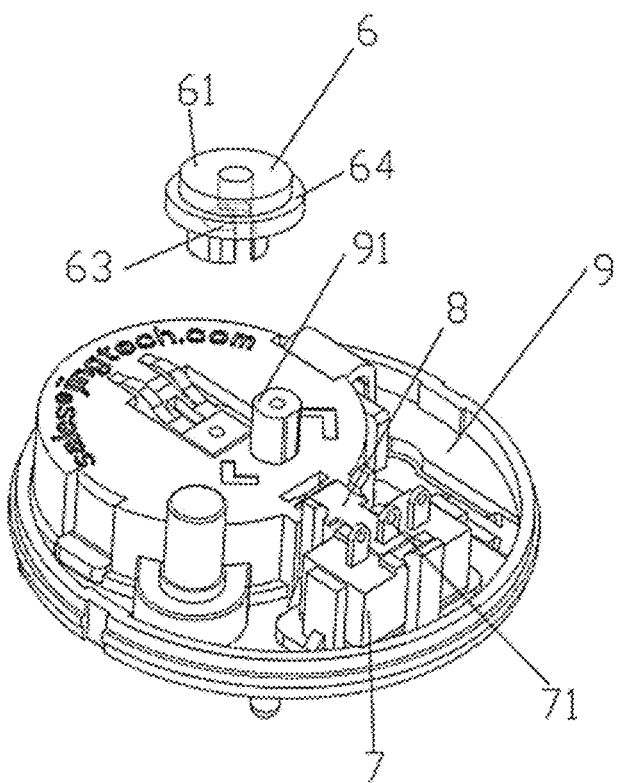
FIG. 9 illustrates a first exploded view of the battery box of the flameless LED candle according to the embodiment of the disclosure.
Figure 10:
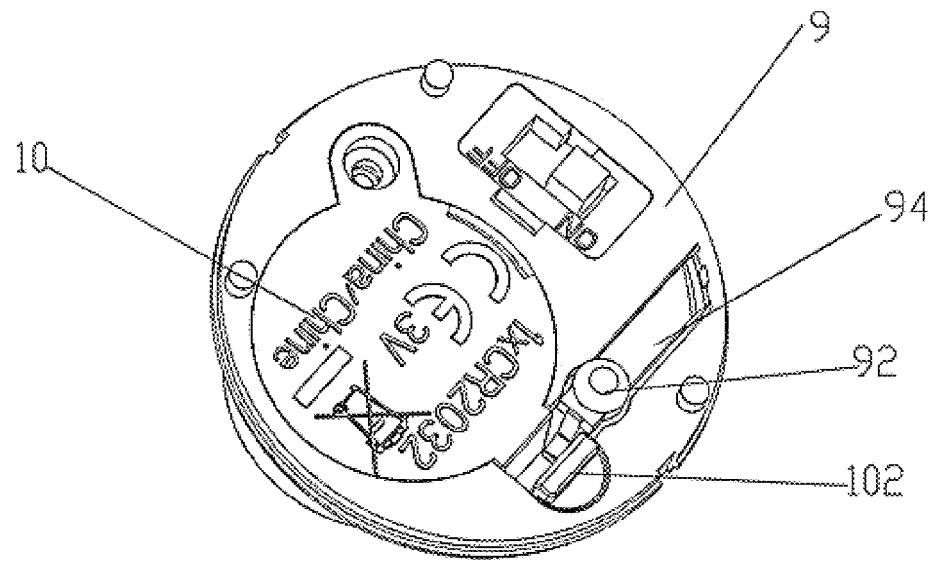
FIG. 10 illustrates a second schematic structural diagram of the battery box of the flameless LED candle according to the embodiment of the disclosure.
Figure 11:
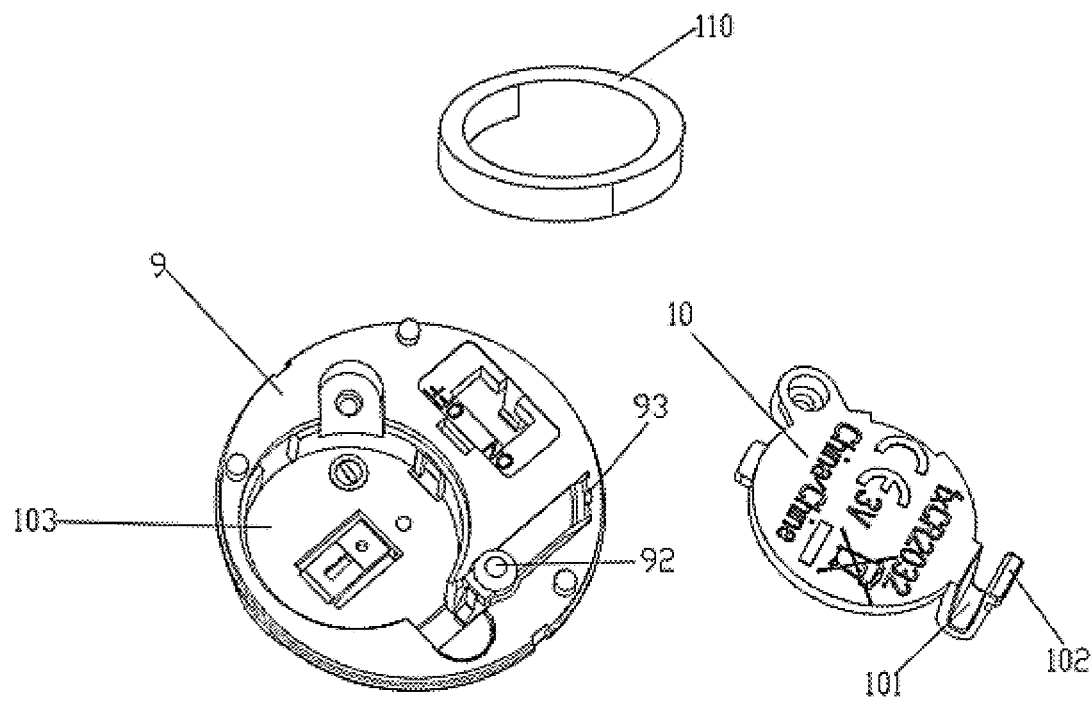
FIG. 11 illustrates a second exploded view of the battery box of the flameless LED candle according to the embodiment of the disclosure.
Figure 12:
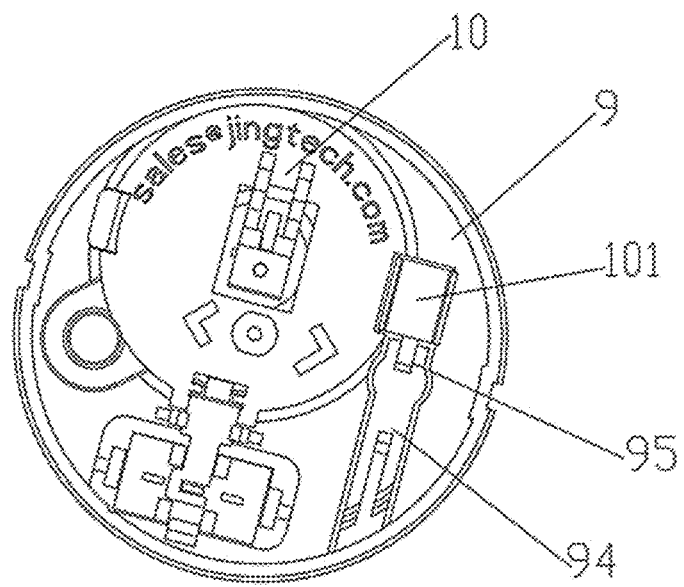
FIG. 12 illustrates a third schematic structural diagram of the battery box of the flameless LED candle according to the embodiment of the disclosure.
Figure 13:
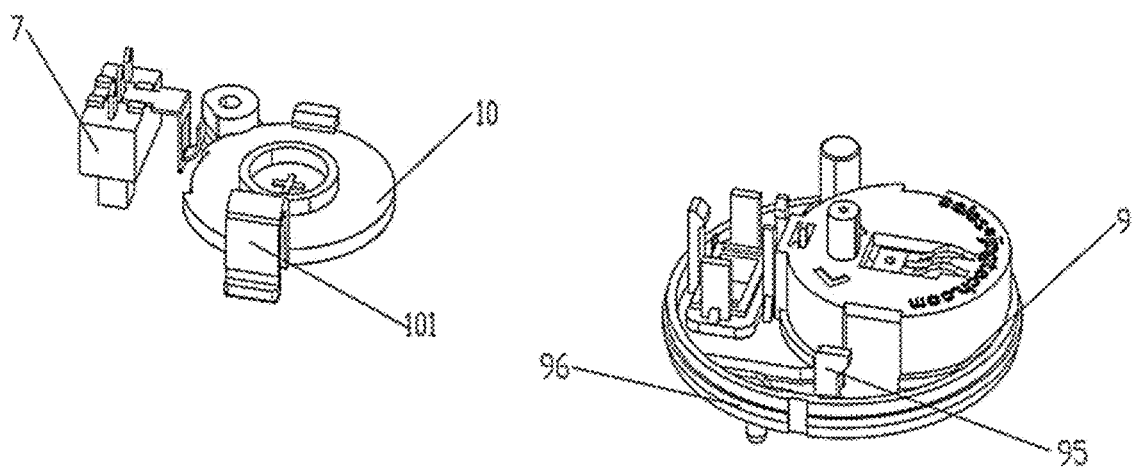
FIG. 13 illustrates a third exploded view of the battery box of the flameless LED candle according to the embodiment of the disclosure.

Referring to FIG. 7 and FIG. 8, in the embodiment, the connecting component 6 is cylindrical, a surface of the connecting component 6 defines a connecting component hole 62, the connecting component 6 defines a notch 65 underside, the first pin 21 is connected to the battery 110 through the connecting component hole 62, and the second pin 22 is connected to the switch device 7 through the connecting component hole 62 along the notch 65.

In the embodiment, furthermore, an outer wall of the connecting component 6 is provided with a first convex edge 63 of a ring shape. The first convex edge 63 is configured to enhance the rigidity of the connecting component 6, making the connecting component 6 more stable.

Referring to FIG. 2, and FIG. 7 to FIG. 9, in the embodiment, the shell 5 defines a third through hole 51 therein, and the connecting component 6 matches the third through hole 51. A top surface 61 of the connecting component 6 is flush with a top surface 52 of the third through hole 51. An upper surface 64 of the first convex edge 63 of the connecting component 6 is flush with a bottom surface 53 of the third through hole 51.

In the embodiment, the battery box 9 is configured to place the battery 110, and a side of the battery box 9 is provided with the switch device 7. The switch device 7 includes a battery elastic piece 8. An end of the battery elastic piece 8 is connected to a pin 71 of the switch device 7, and another end of the battery elastic piece 8 is connected to the battery 110.

In the embodiment, the first pin 21 passes through the black wick sleeve 4 and then through the connecting component 6 to connect with the battery 110. The second pin 22 passes through the black wick sleeve 4 and then through the connecting component 6, making a bend along the notch 65 of the connecting component 6 to connect with the switch device 7. In this way, the need for a circuit board and control circuit is eliminated, simplifying the structure of the disclosure and significantly reducing production costs.

Referring to FIG. 2, and FIG. 7 to FIG. 13, in the embodiment, an outer wall of the battery box 9 is provided with a third convex edge 96 of a ring shape. A bottom of the shell 5 defines a second recess 54. The second recess 54 is defined around the bottom of the shell 5, and snap-fitted to the third convex edge 96. A second latch 55 is disposed in the second recess 54, and the second recess 54 is snap-fitted to the third convex edge 96 through the second latch 55, making the connection between the shell 5 and the battery box 9 more tight and secure, and making the flameless LED candle more stable and safer to use.

In the embodiment, the battery box 9 includes an upright column 91 therein, configured to limit the height. The connecting component 6 is disposed on the upright column 91. The first pin 21 is connected to the battery 110 through first passing through the connecting component 6 and then passing through the upright column 91. The connecting component 6 is disposed on the upright column 91, covering the gap of the third through hole 51 in the shell 5, serving an aesthetic purpose. In addition, the connecting component 6 makes the candle flame 1 more stable and provides protection for the first pin 21 and the second pin 22. Furthermore, by setting the connecting component 6, when assembling the various components of the flameless LED candle, one can first install the connecting component 6 in the battery box 9, then install the candle flame 1, and finally assemble the shell 5, making it more convenient for the assembly of the flameless LED candle of the disclosure and improving work efficiency.

Referring to FIG. 1, and FIG. 3 to FIG. 6, in the embodiment, the black wick sleeve 4 defines a first through hole 41 and a second through hole 42, the first pin 21 is disposed in the first through hole 41, and the second pin 22 is disposed in the second through hole 42. This not only makes the operation of the first pin 21 and the second pin 22 more simple and convenient but also provides better protection for the first pin 21 and the second pin 22.

In this embodiment, the LED light 2 includes a fixing component 3. The fixing component 3 is disposed on the black wick sleeve 4. Furthermore, the black wick sleeve 4 is disposed in the fixing component 3. The fixing component 3 not only serves as a protective role for the black wick sleeve 4, but also plays a role in stabilizing and ensuring the safe use of the LED light 2.

In the embodiment, the fixing component 3 is cylindrical and defines a fixing component hole 32, and the black wick sleeve 4 is disposed in the fixing component 3 through the fixing component hole 32.

In the embodiment, an outer wall of the fixing component 3 is provided with a second convex edge 31 of a ring shape, the second convex edge 31 is configured to enhance the rigidity of the fixing component 3, and a height of the fixing component 3 is flush with a height of the black wick sleeve 4, providing more effective protection for the black wick sleeve 4.

In the embodiment, furthermore, a bottom of the candle flame 1 defines a first recess 11. The first recess 11 is defined around the bottom of the candle flame 1, and the first recess 11 is snap-fitted to the second convex edge 31. The first recess 11 includes a first latch 12, and the first latch 12 is snap-fitted to the second convex edge 31, making the connection between the candle flame 1 and the fixing component 3 more secure, and the use of the candle flame 1 more stable.

Embodiment 2

Referring to FIG. 7 to FIG. 13, in the embodiment, the battery box 9 includes a battery compartment cover 10 thereon and a battery compartment 103 therein, and the battery 110 is disposed in the battery compartment 103, making the use of the battery safer and more reliable.

In the embodiment, a side of the battery compartment cover 10 is provided with a U-shaped latch 101, and the battery box 9 includes an elastic block 95 disposed in the U-shaped latch 101.

In the embodiment, furthermore, the battery box 9 includes an elastic piece 94, the elastic block 95 is disposed on the elastic piece 94, the elastic piece 94 includes a button 92, and a position of the button 92 corresponds to a position of the elastic block 95.

In the embodiment, an end of the elastic piece 94 is provided with a connecting section 93, and the elastic piece 94 is connected to the battery box 9 through the connecting section 93.

In the embodiment, a bottom of the U-shaped latch 101 includes a handle 102. When the battery compartment cover 10 does not need to be opened, the handle 102 is snap-fitted to a bottom plate at a back side of the battery box 9.

In this embodiment, when the battery compartment cover 10 does not need to be opened, the elastic block 95 is snap-fitted in the U-shaped latch 101 to prevent children from opening the battery compartment cover 10 to access the button cell battery, which could affect the safe use of the flameless LED candle of the disclosure.

When it is necessary to open the battery compartment cover 10, the button 92 is pressed upwards by one hand. Since an end of the elastic piece 94 is connected to the battery box 9, pressing the button 92 causes the elastic block 95 to pivot outwards away from the U-shaped latch 101, around the connection section 93 between the elastic piece 94 and the battery box 9. The handle 102 is manipulated by another hand to be separated from the battery box 9, thus allowing the battery compartment cover 10 to be opened.

The flameless LED candle of the disclosure is highly practical, has a more rational structure, is more convenient to use, and offers better stability, meeting the needs of consumers.

The above description is only illustrated embodiments of the disclosure and does not limit the patent scope of the disclosure. Any equivalent structural transformation made using the content of specification and drawings of the disclosure, or directly/indirectly applied in other related technical fields, under the inventive concept of the disclosure, is included in the patent protection scope of the disclosure.

What is claimed is:

1. A flameless light-emitting diode (LED) candle, comprising: a shell; wherein the shell comprises:
   a battery box, comprising a battery;
   a candle flame, comprising a LED light therein; and
   a switch device;
   wherein the LED light comprises a first pin and a second pin, the first pin and the second pin are provided with a wick sleeve, a connecting component is disposed under the LED light, the first pin is connected to the battery through the connecting component, and the second pin is connected to the switch device through the connecting component;
   wherein the battery box comprises a battery compartment cover and a battery compartment therein, the battery is disposed in the battery compartment, a side of the battery compartment cover is provided with a U-shaped latch, the battery box comprises an elastic block disposed in the U-shaped latch, the battery box comprises an elastic piece, the elastic block is disposed on the elastic piece, the elastic piece comprises a button, and a position of the button corresponds to a position of the elastic block.

2. The flameless LED candle as claimed in claim 1, wherein the wick sleeve defines a first through hole and a second through hole, the first pin is disposed in the first through hole, and the second pin is disposed in the second through hole.

3. The flameless LED candle as claimed in claim 2, wherein the connecting component is cylindrical, a surface of the connecting component defines a connecting component hole, the connecting component defines a notch underside, the first pin is connected to the battery through the connecting component hole, and the second pin is connected to the switch device through the connecting component hole along the notch.

4. The flameless LED candle as claimed in claim 3, wherein an outer wall of the connecting component is provided with a first convex edge of a ring shape.

5. The flameless LED candle as claimed in claim 4, wherein the LED light comprises a fixing component, and the fixing component is installed on the wick sleeve.

6. The flameless LED candle as claimed in claim 5, wherein the fixing component is cylindrical and defines a fixing component hole, and the wick sleeve is disposed in the fixing component through the fixing component hole.

7. The flameless LED candle as claimed in claim 6, wherein an outer wall of the fixing component is provided with a second convex edge of a ring shape, and a height of the fixing component is flush with a height of the wick sleeve.

8. The flameless LED candle as claimed in claim 7, wherein a bottom of the candle flame defines a first recess, and the first recess is snap-fitted to the second convex edge.

9. The flameless LED candle as claimed in claim 8, wherein a first latch is disposed in the first recess, and the first recess is snap-fitted to the second convex edge through the first latch.

* * * * *